(12) United States Patent
Birch et al.

(10) Patent No.: US 7,213,742 B1
(45) Date of Patent: May 8, 2007

(54) SYSTEM AND METHOD FOR VALUE CREATION

(75) Inventors: Robert D. Birch, Orlando, FL (US); Joseph P. Lupo, Apopka, FL (US); Scott A. Irwin, Water Springs, FL (US); Stephen D. Weagraff, Orlando, FL (US); Sanjiv Karani, Mason, OH (US); Jeff Gordon, Longwood, FL (US)

(73) Assignee: Convergys Information Management Group, Inc., Cincinnati, OH (US)

( * ) Notice: Subject to any disclaimer, the term of this patent is extended or adjusted under 35 U.S.C. 154(b) by 0 days.

(21) Appl. No.: 11/011,720

(22) Filed: Dec. 14, 2004

Related U.S. Application Data

(63) Continuation-in-part of application No. 10/392,496, filed on Mar. 20, 2003.

(60) Provisional application No. 60/571,166, filed on May 13, 2004.

(51) Int. Cl.
*G06F 17/00* (2006.01)
*G06Q 30/00* (2006.01)

(52) U.S. Cl. .................................. 235/375; 705/14
(58) Field of Classification Search .............. 235/375; 705/14
See application file for complete search history.

(56) References Cited

U.S. PATENT DOCUMENTS

| | | | |
|---|---|---|---|
| 5,276,311 A | 1/1994 | Hennige | |
| 5,325,418 A | 6/1994 | McGregor et al. | |
| 5,577,100 A | 11/1996 | McGregor et al. | |
| 5,590,038 A | 12/1996 | Pitroda | |
| 5,619,247 A | 4/1997 | Russo | |
| 5,625,669 A | 4/1997 | McGregor et al. | |
| 5,631,947 A | 5/1997 | Wittstein et al. | |
| 5,806,045 A * | 9/1998 | Biorge et al. | ................... 705/14 |
| 5,884,271 A | 3/1999 | Pitroda | |
| 5,999,914 A * | 12/1999 | Blinn et al. | ................... 705/26 |
| 6,123,259 A * | 9/2000 | Ogasawara | ................ 235/380 |
| 6,138,004 A | 10/2000 | McGregor et al. | |
| 6,182,054 B1 | 1/2001 | Dickinson et al. | |
| 6,198,915 B1 | 3/2001 | McGregor et al. | |
| 6,199,047 B1 | 3/2001 | Dimino et al. | |

(Continued)

OTHER PUBLICATIONS

Sundgot, J., Nokia, Mastercard Make Bid for M-wallet; May 13, 2003; http://www.infosyncworld.com/news/n/3756.html.

(Continued)

*Primary Examiner*—Seung Ho Lee
*Assistant Examiner*—Jamara A. Franklin
(74) *Attorney, Agent, or Firm*—Frost Brown Todd LLC

(57) ABSTRACT

There is disclosed a system and method for creating value by facilitating third party participation in mobile commerce transactions, providing consumers with a unified perspective of commercial activity, and selectively implementing discounts. The system may include a computerized engine and a point of sale wallet, which may be embedded in a personal trusted device. The computerized engine may be programmed to selectively implement a discount associated with a particular transaction. The personal trusted device may comprise a wireless communications technology, which enables the device to communicate with a back-end system and/or other point of sale devices. The personal trusted device may serve as the nexus of consumer transactions by facilitating payment as well as receipt and storage of electronic receipts. The personal trusted device may also be configured to transmit electronic receipts via the communications technology.

19 Claims, 5 Drawing Sheets

U.S. PATENT DOCUMENTS

| | | | |
|---|---|---|---|
| 6,237,145 | B1 | 5/2001 | Narasimhan et al. |
| 6,240,401 | B1 | 5/2001 | Oren et al. |
| 6,243,574 | B1 | 6/2001 | McGregor et al. |
| 6,293,462 | B1 * | 9/2001 | Gangi ................. 235/380 |
| 6,381,316 | B2 | 4/2002 | Joyce et al. |
| 6,434,238 | B1 | 8/2002 | Chaum et al. |
| 6,443,574 | B1 | 9/2002 | Howell et al. |
| 6,460,072 | B1 | 10/2002 | Arnold et al. |
| 6,487,540 | B1 * | 11/2002 | Smith et al. ................. 705/21 |
| 6,490,601 | B1 | 12/2002 | Markus et al. |
| 6,587,835 | B1 * | 7/2003 | Treyz et al. ................. 705/14 |
| 6,705,520 | B1 | 3/2004 | Pitroda et al. |
| 6,769,607 | B1 | 8/2004 | Pitroda et al. |
| 7,016,681 | B2 * | 3/2006 | Hata et al. ................. 455/445 |
| 2002/0003169 | A1 | 1/2002 | Cooper |
| 2002/0025795 | A1 | 2/2002 | Sharon et al. |
| 2002/0029191 | A1 | 3/2002 | Ishibashi et al. |
| 2002/0116329 | A1 | 8/2002 | Serbetcioglu et al. |
| 2002/0144275 | A1 | 10/2002 | Kay et al. |
| 2002/0174016 | A1 | 11/2002 | Cuervo |
| 2002/0188575 | A1 | 12/2002 | Freeny, Jr. |
| 2003/0009422 | A1 | 1/2003 | Gopalan |
| 2003/0187784 | A1 | 10/2003 | Maritzen et al. |
| 2004/0010462 | A1 | 1/2004 | Moon et al. |
| 2004/0049452 | A1 | 3/2004 | Blagg |

OTHER PUBLICATIONS

Thomas, N.A., Infrared and Bluetooth Transactions at the Point of Sale; © 1999-2001; Telecommunications Development Asia-Pacific; http://www.tdap.co.uk/uk/archive/mobile/mob/(in2m_0109).html.

Chameleon Network-Pocket Vault System Overview; http://www.chameleonnetwork.com/Product_Overview_15.pdf.

Wave: http://www.wave.com/about/faq.html.

*InterTrust Technologies*: http://www.intertrust.com/main/ip/litigation.html.

* cited by examiner

Mobile Commerce Reconciliation
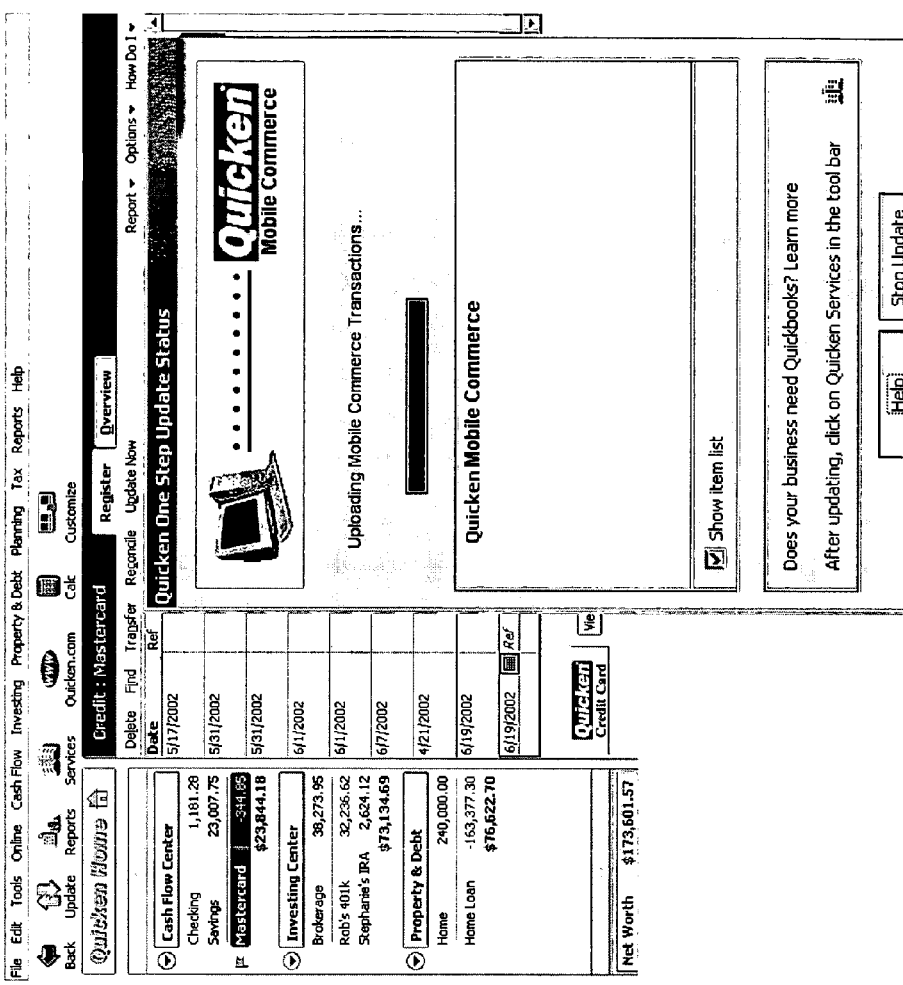
Figure 5
Carrier Reconciliation
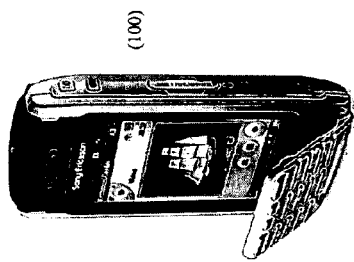
(100)
Consumer Record

SYSTEM AND METHOD FOR VALUE CREATION

This is a Non-Provisional Patent Application, which claims priority from U.S. Provisional Application No. 60/571,166, filed on May 13, 2004, which is incorporated by reference herein. This application is a Continuation-In-Part of U.S. patent application Ser. No. 10/392,496 (publication number 2003-0187794), filed on Mar. 20, 2003.

BACKGROUND OF THE INVENTION

This invention is in the field of mobile commerce transactions and particularly the utilization of computerized engines to facilitate third party participation in mobile commerce transactions.

Single purpose computerized end devices, i.e., cell phones, pagers, personal digital assistants, etc., have become commonplace. These single purpose devices have not, in the past, included application hosting facilities given the network and processors that were available. Any intelligence had to be found in the "hosts" that they were attached to.

Four key trends are shaping the computerized consumer transaction industry: increased processing power on user devices; longer lasting batteries for user devices; standardization of the development and operating environment on user devices (standard operating systems); and finally, the demand and growth of applications executing on user devices.

As technology advances, so must the availability of consumer transaction applications on user devices. Customer care and billing applications (including pre-paid applications) have generally followed a network-centric or server-centric processing model. Network-centric models process and store information centrally on the network. The device or access point generates/facilitates the data or events. Customer data is housed on centralized databases. Rating and pricing for events involves some sort of network activity or usage.

Recent inventions have facilitated movement of some or all of the processing functionality to the end device (please see, U.S. Published Patent Application No. 2003-0187794, entitled System and Method for a Flexible Device-Based Rating Engine, Irwin et al, filed on Mar. 20, 2003). In these systems, a computerized engine, specifically, a device-based rating engine, may be incorporated into virtually any end device. The device-based rating engine may include a computerized application, which facilitates the intelligent configuration of computerized metering, rating, billing and managing of account balances on an end computing device. The device-based rating engine may then interact with a back-end system through a network on an as-needed basis to communicate the processing results.

User devices may also represent a natural integration point for a wide variety of consumer transactions applications ranging from voice, to data, to content, to next generation services such as mobile infotainment (i.e., information and entertainment). The power, convenience and ubiquity of these smart devices may drive the rapid adoption of new services, and in the process, create enormous value for consumers.

Most consumer transactions are still processed via paper. Typically, a consumer transaction occurs directly between the vendor and the consumer with cash or a financial settlement mechanism, such as a credit card. This usually occurs directly on the vendor's premises with the vendor's financial instruments. In the standard transaction model, the consumer receives a separate bill for each individual financial settlement mechanism (i.e., each credit card, checking account, etc.). If the customer wishes to verify the billing charges itemized on each statement, then the customer must maintain a copy of the sales receipt for each transaction. Furthermore, if the customer wishes to return a good or service, then the customer must sort through his or her receipts to find the receipt for the specific transaction.

Mobile commerce transactions may occur on a mobile carriers' network infrastructure and may not require use of the vendor's financial instruments. Nevertheless, consumers still receive separate bills for each individual financial settlement mechanism and may still be forced to retain copies of receipts (paper or electronic). Additionally, the network providers usually do not actively participate in mobile commerce transactions, but rather merely facilitate the transaction by serving as a network pipe though which opaque data may travel. For this reason, the reality for network infrastructure providers, such as wireless carriers as well as Mobile Virtual Network Operators (MVNOs), is that they are cut out of the value chain during financial transactions that do not directly involve either the carrier-managed balance or the carrier's transmission network. Moreover, they are essentially providing a mobile commerce platform for which others will benefit.

BRIEF SUMMARY OF THE INVENTION

Various embodiments (including systems and methods) for creating value for network providers are disclosed. These embodiments may employ one or more of the following features disclosed herein either singly or in combination. These embodiments may facilitate the emerging technologies discussed in the background above, as well as technologies yet to come.

Embodiments of the invention provide a facility for a third party, such as a wireless carrier or MVNO, to become an active participant in a mobile commerce transaction, thus creating value for the third party. Mobile commerce transactions may refer to the buying and selling of goods and services through wireless handheld devices. In particular, a device-based rating engine may be used as the nexus of the transaction, thus enabling the device to provide a unified perspective of all consumer activity. The systems and methods disclosed herein may also provide value to consumers because consumers will be able to view this unified perspective of their activity on their devices.

A system for enabling value creation may comprise a personal trusted device (PTD), a computerized engine, a point of sale wallet (POS wallet), and a back-end processing system. The computerized engine and the POS wallet may be installed on the PTD. The PTD may consist of a handheld or stationery machine that may be used for payment. The PTD may include a security element such as an encoded PIN number, a voice recognition system, a type of biometric identifier (e.g., a fingerprint recognition mechanism), a removable hardware element, or any other type of security element. Examples of PTDs include, but are not limited to, personal computers, mobile phones, PDAs, smartphones, electronic payment devices, handheld devices, music players, and game consoles. The PTD may be fixed or mobile.

The computerized engine may be a processor configured to process an event using instructions encoded on the computerized engine. The computerized engine may be deployed over the following embodiments: hardware, firmware, operating system, and/or an application level deployment. Components of the computerized engine may be distributed over one or more of these deployments as well. The computerized engine may be configured to communicate with the back-end system via a network, or with a peer to receive computer executable instructions. The network connection may be periodic (scheduled), intermittent (random), or occasional (user-initiated).

The POS wallet may be a small software program that may contain one or more payment methods that may be used to complete a consumer purchase at the time and place of a sale. For example, the POS wallet may include various credit cards, debit cards, retailer loyalty cards, prepaid cards, and carrier payment instruments, such as stored value accounts. Stored value accounts may refer to any accounts that provide a substitute for cash, checks, and credit cards. The card holder or account operator may add monetary value to the stored value account. Merchants may authorize purchases against the value in the account. The account may be host-based (i.e., managed by an account operator) or a chip card (i.e., value resides on a circuit chip, which is integrated into the card).

The PTD may be equipped with a communications technology. The communications technology may be any mechanism or medium that carries a message across a communication path, including, but not limited to wireless short distance technologies, such as Bluetooth, Infrared Data Association Financial Management (IrDAFM), or Mobile Electronic Transaction Forum (MeT). The back-end processing system may be the support component of a computer system. It may function as a database management system, which is the storehouse for all data. The PTD may be configured to establish a secure connection to the network provider's back-end system via the communications technology, thus enabling the PTD to communicate with the back-end system.

The PTD may be further configured to establish a secure connection and communicate with a vendor's point of sale (POS) device. The point of sale device may be a machine that captures data at the time and place of sale. The point of sale device may be used in combination with cash registers, bar code readers, optical scanners and/or magnetic stripe readers to accurately and instantly capture a transaction. For example, the typical POS credit card reader may be modified to receive a signal from the PTD in addition to or as opposed to decoding magnetic information from a credit card swiped through the card reader.

A PTD comprising Bluetooth may search for the merchant's POS using a Bluetooth Device Inquiry sequence and then request the Bluetooth Device Names of the discoverable devices. After obtaining these names, the PTD may prompt the user to ask which device to connect to and establish a link, channel, and connection to the selected device. Alternatively, a PTD comprising Infrared Data Association Financial Management (IrDAFM) technology may use a polling scheme to collect responses from all devices in its line of sight, including the merchant's POS, and then begin communication upon detection.

Embodiments of the present invention may enable network providers to insert themselves into the commerce value chain. This may, in turn, create unique value, enhance the network provider's customer and vendor relationships, and increase network usage. These benefits may ultimately cause an increase in the network provider's revenues. Further, if consumers derive a greater utility from their consumption as a result of their affiliation with the network provider, then the provider may be able to charge a premium for the services, which may produce top-line and bottom-line improvement.

The mobile commerce transaction may pass through the computerized engine on the PTD. The computerized engine may identify information in the transaction that allows the supplier of networking services for the PTD (the "network provider") to identify the vendor and commerce attributes of the mobile transaction. With this information, the computerized engine may selectively implement a discount associated with the transaction. The discount may be selectively implemented because it may not be applied to every mobile commerce transaction. For example, the computerized engine may provide a discount based upon the network provider's existing vendor partnerships to further add customer value and drive the network provider's business opportunities. If the mobile commerce transaction was associated with a vendor that the network provider had a partnership with, then the computerized engine would implement the discount. If, however, the mobile commerce transaction was not associated with a vendor that the network provider had a partnership with, then the discount would not be implemented.

In one embodiment, the computerized system may include a PTD, which may contain a computerized engine, a point of sale wallet containing at least one transaction payment method, and a wireless communications technology, and a back-end processing system. The computerized engine may be configured to process a mobile commerce transaction by communicating with a point of sale device. The engine may also be configured to receive and store an electronic receipt (e-Receipt) for each mobile commerce transaction and may then transmit each of the e-Receipts to the back-end processing system through the wireless communications technology. The computerized engine may be further configured to selectively implement a discount based on a partnership. The discount may be pre-programmed. The discount may also be contemporaneously generated. The partnership may be a trusted partnership wherein a combination of entities maintain a relationship with one another that is characterized by mutual cooperation and/or responsibility.

In other embodiments, a PTD enabled with a computerized engine, such as a device-based rating engine, may monitor and/or record every mobile commerce transaction independent of whether or not the transaction is managed on the computerized engine. The computerized engine may provide a unified customer perspective of all mobile commerce transactions, regardless of whether they occurred with different vendors or different financial and data networks. Thus, while the applications and services and the context in which they are used may change from time-to-time, the device itself may remain constant. Accordingly, the mobile operator or network provider may add value for the consumer.

The computerized system for processing consumer transactions may include a personal trusted device, which may contain a computerized engine, a point of sale wallet that includes at least one transaction payment method, and a communications technology, and a back-end processing system. Examples of transaction payment methods include, but are not limited to credit cards, debit cards, retailer loyalty cards, prepaid cards, and carrier payment instruments. The computerized engine may be configured to receive and store an electronic receipt for the mobile commerce transaction and may be further configured to transmit each electronic receipt to the back-end processing system through the communications technology. The computerized engine may be programmed to selectively implement a discount associated with the mobile commerce transaction.

In some embodiments, the system may also include a point of sale device. In these embodiments, the computerized engine may be configured to process the mobile commerce transaction by communicating with the point of sale device.

The discount may be an electronic discount, an electronic coupon, or both. The discount may be resident on the device or it may be downloaded from the back-end processing system. In addition, the computerized engine may be configured to selectively implement the discount based on a partnership. The partnership may be between a network provider and at least one vendor. The discount may consist of a cross-product discount, which may be a discount that applies when a consumer purchases multiple products. The cross-product discount may be applied to a mobile commerce transaction associated with a particular product when a consumer purchases that particular product along with or after purchasing another product.

In other embodiments, the computerized system may be configured to apply a cross-device discount on all of a user's personal trusted devices, all of a corporation's personal trusted devices, or all of a group of entities' personal trusted devices. The computerized engine may be further configured to provide a user with a set of proactive information, such as current promotions, upcoming promotions, partnerships, and combinations thereof. For instance, if a user is engaged in a transaction with a vendor, then that vendor may proactively provide the user with information about a second vendor with whom it has a partnership.

The personal trusted device may be configured to display the electronic receipts. Further, the computerized engine may be configured to sort the electronic receipts based on a set of user-defined factors, including, but not limited to, date, time, dollar amount, payment method, discount, vendor, product type, most recent, or combinations thereof. The sorting functionality may be useful for budgeting or preparing taxes.

In another embodiment, the computerized system for processing consumer transactions may include a personal trusted device comprising a computerized engine and a point of sale wallet comprising at least one transaction payment method, and a point of sale device. The computerized engine may be configured to receive and store an electronic receipt for at least one mobile commerce transaction and may be programmed to selectively implement a discount associated with the mobile commerce transaction. The computerized engine may selectively implement the discount based on a partnership. The partnership may be between two vendors.

Yet another embodiment may consist of a computer-readable medium encoded with computer executable instructions, for installation upon a personal trusted device. The computer-readable medium may have a computer memory, which may configure the personal trusted device to communicate with a point of sale device, receive and store an electronic receipt for at least one mobile commerce transaction, transmit each electronic receipt to a back-end processing system, and selectively implement a discount associated with the mobile commerce transaction. The computer executable instructions may further configure the consumer device to sort the electronic receipts based on a set of factors, such as date, time, dollar amount, payment method, discount, vendor, product type, or combinations thereof.

Another embodiment may encompass a method of utilizing a personal trusted device to process consumer transactions. The method may include the steps of configuring the personal trusted device to communicate with a point of sale device, the personal trusted device receiving and storing at least one electronic receipt for at least one mobile commerce transaction, the personal trusted device transmitting each electronic receipt to a back-end processing system, and the personal trusted device selectively implementing a discount associated with the mobile commerce transaction. The personal trusted device may include a computerized engine, a point of sale wallet comprising at least one transaction payment method, and a communications technology.

Other embodiments may provide for facilitating a mobile commerce transaction through a wireless device. In one embodiment, the method may include receiving a discount plan from at least one vendor, storing the discount plan in a database, receiving a signal from a computerized engine regarding a mobile commerce transaction, comparing a vendor associated with the mobile commerce transactions with the discount plan, and applying a discount to the mobile commerce transaction based on the discount plan. The discount may be a cross-product discount. The discount may be applied in real time, near real time, or after the transaction.

In another embodiment, the method may include the step of creating a joint marketing plan between a network provider and a vendor. The marketing plan may include a discount plan to be applied across all of a user's personal trusted devices. The discount plan may be stored in a database. The system may receive a signal from one of the user's personal trusted devices regarding a mobile commerce transaction and compare the product involved in the mobile commerce transaction against the discount plan. The method may then apply a cross-device discount to the mobile commerce transaction based on all of the mobile commerce transactions that have occurred on all of the user's personal trusted devices in real time or near real time based on the discount plan.

BRIEF DESCRIPTION OF THE DRAWINGS

FIG. 5 illustrates an opportunity for consumer financial reconciliation that may be available through the system.

DETAILED DESCRIPTION OF THE INVENTION

This application discusses systems and methods for creating value for network providers comprising a device-based rating engine, as described in U.S. Published Patent Application No. 2003-0187794, Irwin et al., filed on Mar. 20, 2003, which enables performance of some or all metering, rating, discounting, billing, and account management functions on an end device. Other computerized engines may be employed; the engine described in the aforementioned application is merely offered for explanatory purposes. The terms engine/application/program, as used herein, may refer to any embodiment of computer-executable instructions on a computer readable medium, including but not limited to software, hardware, firmware, modules, programs, routines, etc. The programs described herein are presented according to principles of object-oriented design; however, other programming methodologies may be used as well. The terms and concepts inherent to this model will be easily understood by those of skill in the art.

Figure 1:
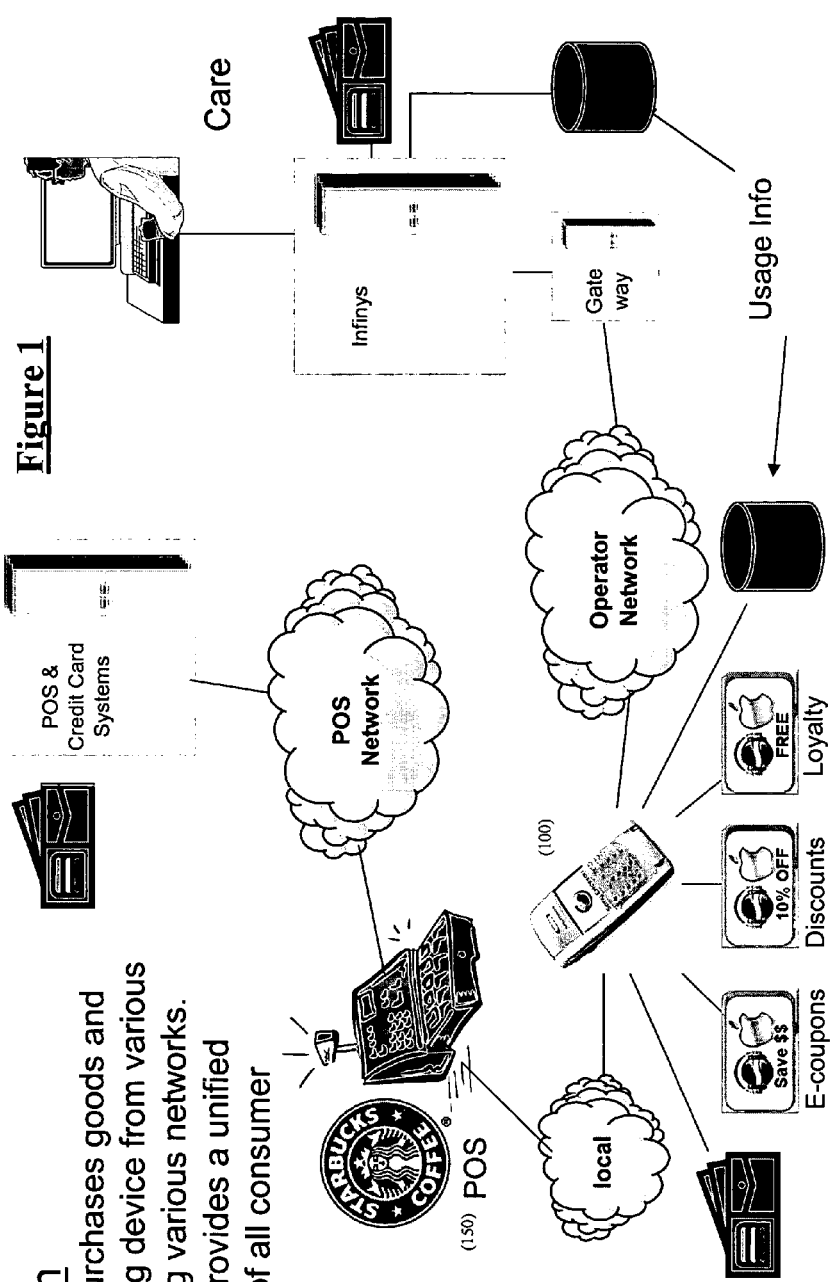
FIG. 1 illustrates a conceptual diagram of the system.

Embodiments of the invention may enable network provider/carrier participation in mobile commerce transactions, thus allowing network providers to create value by inserting themselves into the commerce chain. A network provider may refer to any supplier of services for consumer devices. Mobile commerce transactions may refer to the buying and selling of goods and services through wireless devices. As shown in FIG. 1, this may be achieved by installing a computerized engine, such as a device-based rating engine, on a device. The device may serve as the nexus of the transaction and provide a unified perspective of all consumer activity. Furthermore, this unified perspective may eliminate months of batch processing by allowing network providers to process and collate consumer transactions in real time or near real time.

Figure 2:
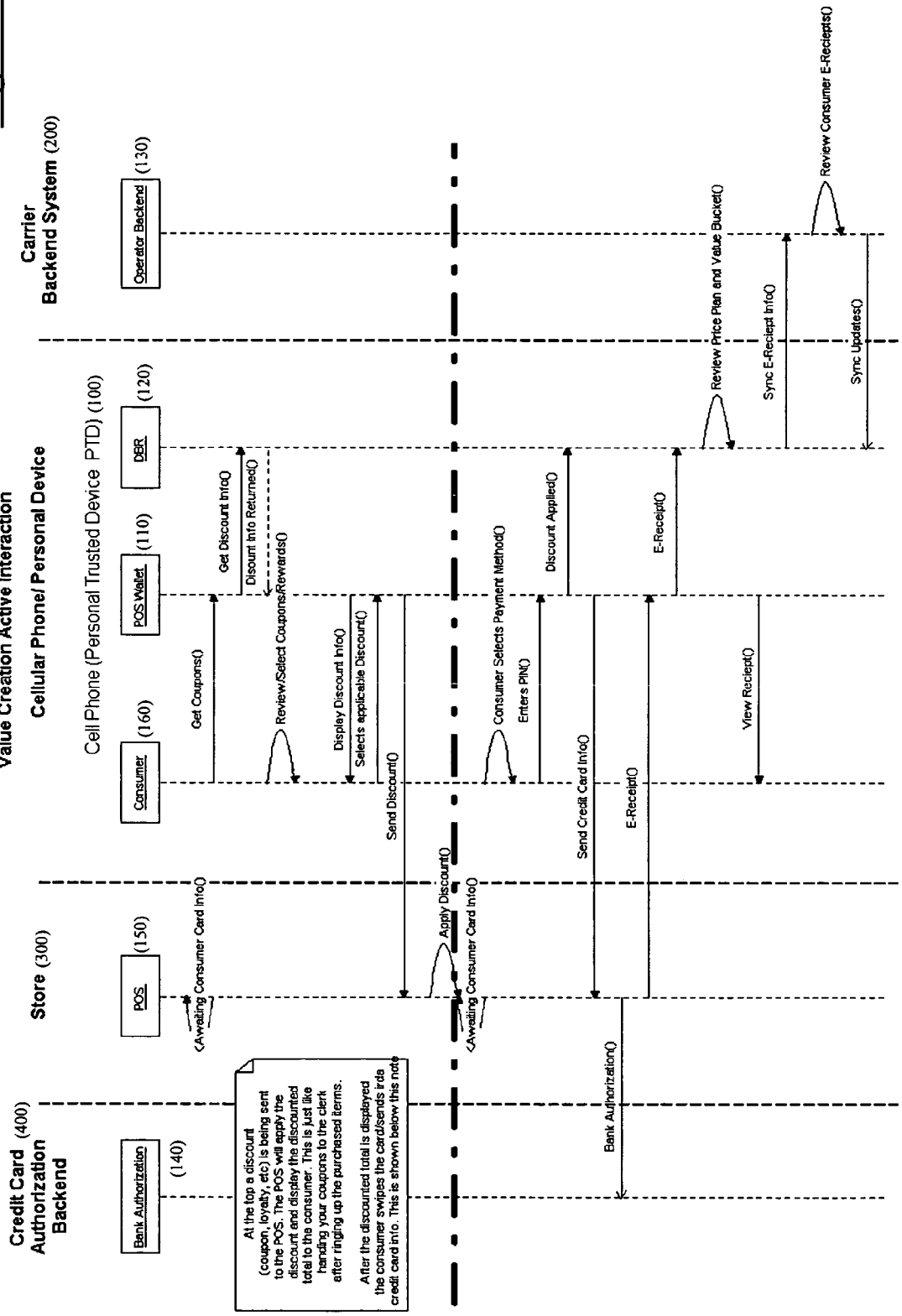
FIG. 2 illustrates a diagram of a passive interaction embodiment of the system.
Figure 3:
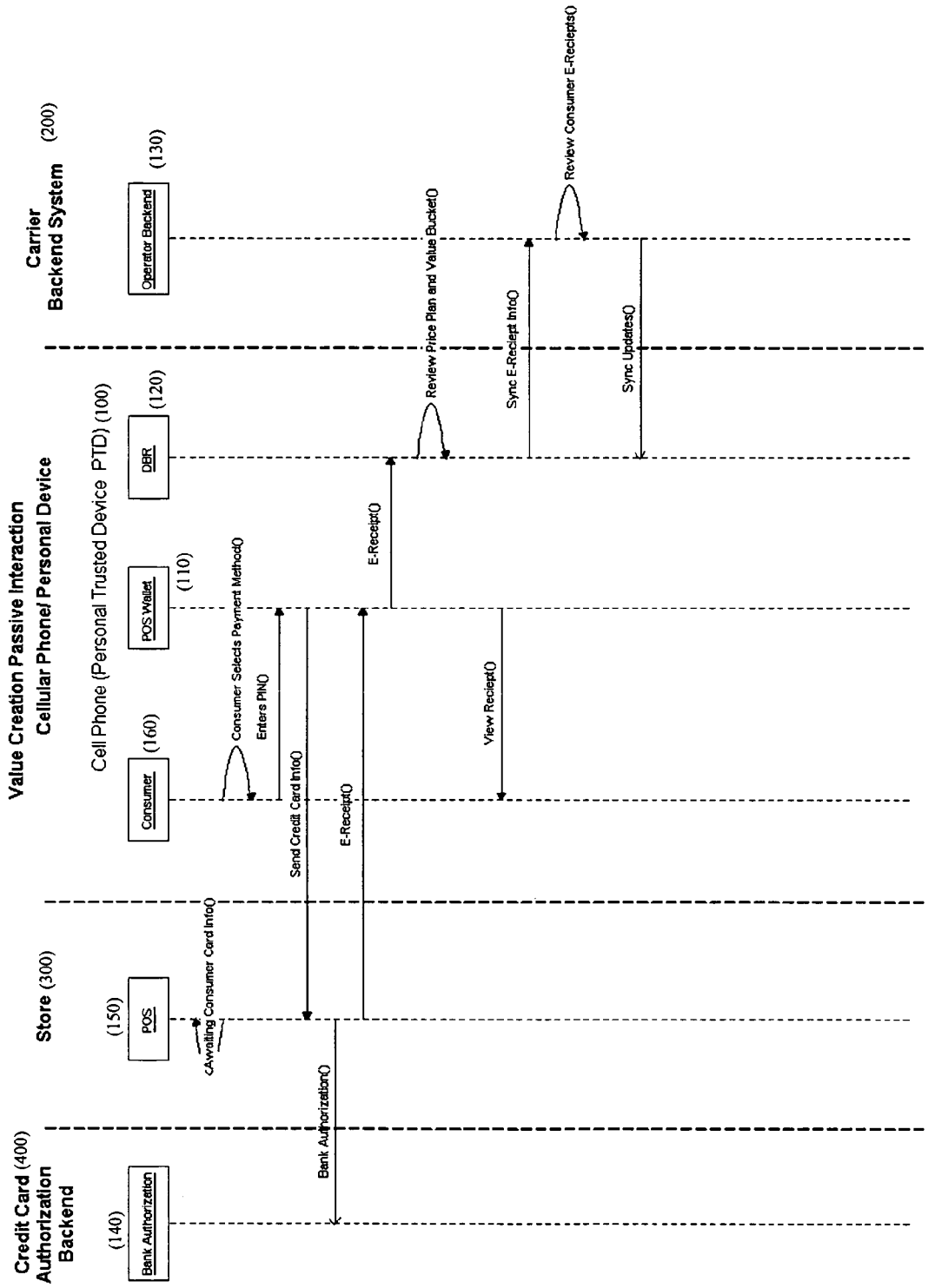
FIG. 3 illustrates a diagram of an active interaction embodiment of the system.

Referring to FIGS. 2 and 3, a system for enabling value creation may comprise a personal trusted device (PTD) (100), a computerized engine (e.g., a device-based rating engine) (120), a point of sale wallet (POS wallet) (110), and a back-end processing system (200). The device-based rating engine (120) and the POS wallet (110) may be installed on the PTD (100). The device-based rating engine enabled PTD (100) may monitor and/or record every mobile commerce transaction independent of whether or not the transaction is managed on the device-based rating engine (120).

The device-based rating engine (120) may incorporate a price plan. A price plan may be a program for rating and metering products and/or services. Price plans may be completely configurable and definable by the vendor and/or network provider. Price plans may be designed around per use, one time charges, duration of use, time of day, number of uses, etc. These plans may also be combined to create more complex price plans. The device-based rating engine (120) may provide a standard set of price plans, but content and service providers are not limited to those price plans.

Each mobile commerce transaction may pass through the computerized engine (120) on the PTD (100). The device-based rating engine (120) may identify information in the transaction that allows the network provider to identify the vendor and commerce attributes of the mobile transaction. The network provider may then utilize this information to customize the mobile commerce transaction. For example, the network provider may selectively implement a discount based on its existing vendor partnerships, the vendor's partnerships, and/or customer relationships. A partnership may be any relationship or affiliation. If, for instance, the network provider has a partnership with a particular vendor, then the network provider may provide a discount on all of a user's purchases made with that particular vendor. Similarly, if a user makes a purchase from two vendors that have an established partnership, then the network provider may implement a discount based on that partnership.

The PTD (100) may be configured to establish a secure wireless connection to the network provider's back-end system (200), thus enabling the PTD (100) to communicate with the back-end system (200). The PTD (100) may communicate with the back-end system (200) to obtain additional pricing or discounting information prior to completion of a sale. The PTD (100) may be further configured to establish a secure wireless connection and communicate with a vendor's point of sale (POS) device (150). The PTD (100) may communicate information to complete the transaction, including, but not limited to, coupons, credit card information, debit card information, and more. The connections may be established using an industry standard short distance technology, such as Bluetooth, Infrared Data Association (IrDA), or Mobile Electronic Transactions (MeT). The vendor's POS (150) may communicate with back-end systems of various financial settlement mechanisms, such as a credit card's back-end system (400).

The systems and methods of the present invention provide several opportunities for value creation. These opportunities may include, for example, convenient payment options, cross-device discounting using vendor relationships, affinity groups, proactive information, and customer control.

Convenient payment options—Each consumer may use many payment options such as credit cards (e.g., Visa, MasterCard), debit cards, retailer loyalty cards, prepaid cards, and carrier payment instruments (e.g., stored value accounts) for mobile commerce, payment, and settlement. The convenient payment options may create value for the consumer because the consumer may use a single device to access all of their payment mechanisms. The device-based rating engine (120) may further record all mobile commerce transactions to provide a single and holistic view of the consumer's consumption. In a preferred embodiment, this view may be provided in real time or near real time. This functionality may also benefit the network provider's business because it enables the network provider to offer unique opportunities for its consumers, such as cross device discounting using vendor relationships and/or affinity groups.

Cross device discounting using vendor relationships—The device-based rating engine (120) may provide enough event data and information regarding each mobile commerce transaction to enable a back-end billing system (200) to provide cross-device discounting based on the network provider's existing vendor relationships.

In addition, the network provider may use information related to the mobile commerce that occurs on all the devices that a consumer has to create and implement discounting. For example, suppose that the head of a household purchases PTDs (100) for all family members with a network provider and the network provider has a partnership with a vendor, for example, a pizza place. The joint marketing plan between the network provider and the pizza place provides that any customer who buys five pizzas gets the sixth pizza free, and the family can be counted as a single customer if they buy pizzas via their PTDs. Thus, once the family has bought five pizzas collectively, any of the family members is eligible to receive the sixth pizza free. Similar promotional schemes may be implemented to apply cross-device discounting on all of a corporation's personal trusted devices or all of a group of entities' (identified by the billing system) personal trusted devices.

The system may utilize financial instruments such as electronic discounts (e-Discounts) and electronic coupons (e-Coupons). The e-Discounts and e-Coupons may be processed on the device (100) (via the device-based rating engine (120)) or in the back-end system (200). The e-Discounts and e-Coupons may support various discounting models, such as twenty percent off the consumer's first purchase and ten percent off the second. e-Coupons could also support discounts based on volume purchases of an item across a given duration. For example, if a user purchases five items in one month, then an e-Coupon may give the user twenty percent off the user's next two purchases.

Further, in another scenario, the network provider may have a partnership with a particular retailer or vendor. In this scenario, the device (100) or the back-end system may recognize when the consumer is engaging in a mobile commerce transaction with the retailer and offer the consumer an e-Discount or an e-Coupon, either of which may be in the form of a certain percentage discount or a certain dollar amount. The device (100) may generate the e-Discounts and e-Coupons itself, or alternatively, the device (100) may download the e-Discounts and e-Coupons from the back-end system (200).

In yet another embodiment, the device-based rating engine (120) and/or the back-end billing system (200) may be configured to implement an e-Discount or an e-Coupon based on a partnership relationship. The partnership may be between two retailers, two products, or combinations thereof. For instance the device-based rating engine (120) or the back-end billing system (200) may recognize a partnership between Target Stores and Starbucks. Accordingly, when a consumer engages in transactions with both Target Stores and Starbucks, the PTD could provide an e-Discount or e-Coupon. Similarly, the device-based rating engine (120) or the back-end processing system (200) may be configured to provide a discount when the consumer purchases both a soft drink and a snack. For instance, the PTD could provide the consumer with a discount if the consumer purchases a can of Pepsi and a bag of Doritos.

Affinity groups—The device (100) may offer specific pricing/discounting based upon implicit or explicit affinity groups. For instance, in one scenario, the network provider may determine that it wants to provide its customers with a discount whenever they purchase any type of soft drink. The device (100) may further be configured to present the customer with an e-Discount or e-Coupon any time the customer purchases a soft drink, regardless of where the purchase is made. The customer thus receives this discount when purchasing a soft drink out of a vending machine, at a drug store, at a restaurant, at a sporting event, or anywhere else.

Proactive information—The device-based rating engine (120) may use the transaction data readily available on the device (100) to provide proactive information. Proactive information may refer to any information related to vendors, the consumer's consumption, or a particular mobile commerce transaction. The proactive information may include current promotions, upcoming promotions, partnerships, and combinations thereof.

The device-based rating engine (120) may generate an electronic receipt (e-Receipt) for every payment transaction processed through the device-based rating engine (120) enabled mobile device (100). The consumer may view and filter these e-Receipts/transactions based on different criteria, such as date, time, dollar amount, payment method, discount, product type, or vendor (e.g., show all transactions at Starbucks). The user may define which factors to sort by. This may make it easy for the user to locate a particular receipt for the purpose of a return, exchange, rebate opportunity, or to verify itemized information on a billing statement.

Accordingly, the consumer may sort his or her e-Receipts/transactions using intelligent analyses. For example, the customer may request to view the total of all mobile commerce charges categorized by different payment types (e.g., all VISA payments), the subtotal of all meal charges (the user defined categories) for the past 7 days (or between two defined dates), the last "n" transactions, the top "n" charges this month (based on $ amount) in category "Music", etc.

Figure 4:
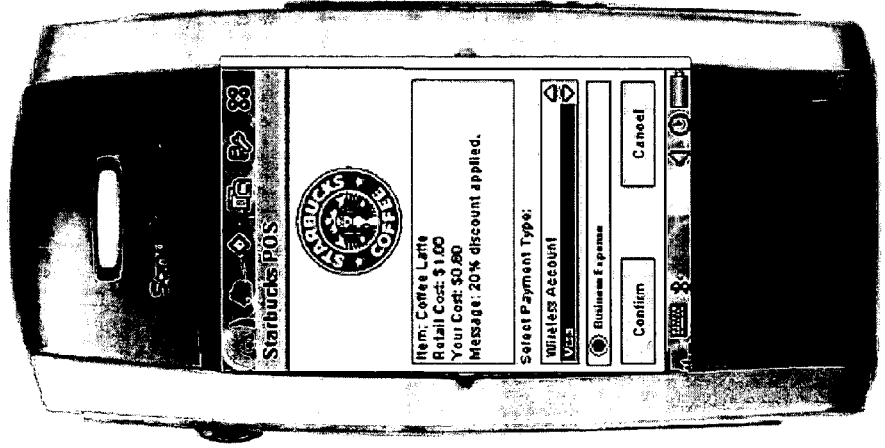
FIG. 4 illustrates the exportation capabilities of the system.

In addition, referring to FIG. 4, the device (100) may be configured to export the e-Receipts to other applications. For example, the device may send receipts to a budgeting, an accounting or a tax preparation program. This exportation may take place automatically or at the customer's request. The device (100) may export the e-Receipts via e-mail or any other electronic transportation method for various uses. These uses may include, for example, enabling wireless submission of claims for electronic rebates, disputing the selected transactions directly on the device, sending e-Receipts to a vendor for matching, auditing, or verification purposes, and more.

In some embodiments, the device (100) may use mobile commerce transaction data to provide proactive information to the network provider's customers. The proactive information may be information regarding a particular vendor or payment type's current and upcoming promotions or it may be information related to the user's consumption. This proactive information may be in the form of a textual message on the device, a voice-mail message played automatically or stored in the customer's mailbox, an e-mail message, etc. The device (100) may further be programmed to alert the user when such information is available. The device (100) may make an audio sound that indicates the information is available or may display a particular symbol or text. The device (100), for example, may inform the customer that a retail store is offering ten dollars off of a fifty-dollar purchase. When the device determines this discount is available, it may beep, ring, display a message or symbol, or otherwise notify the customer that some type of discount information is available.

In yet other embodiments, the device (100) may have the capability to provide proactive information concerning relationships between vendors and payment types. For example, the device (100) may display a message to the consumer that Visa (a payment option) is running a special promotion on a current or future date with Target stores (a vendor) providing an extra five percent off of all electronic purchases. The device (100) may then automatically download a five percent e-Coupon as the consumer enters the store and advise the consumer that he or she will be able to save money by selecting his or her Visa card from the POS wallet (110) when the consumer is ready to checkout.

The device (100) may also provide a budgeting tool for consumers. This may be accomplished by configuring the device (100) to allow the user to set purchase limits. The user may set a global mobile commerce purchase limit and/or an individual payment type purchase limit. The user may set these parameters over a particular time frame, i.e., on a weekly or monthly basis. The device (100) may automatically or at the customer's request, provide a courtesy message when the purchases exceed or are about to exceed the limits. For example, the customer may set a global purchase limit of one hundred dollars per week and a Visa limit of fifty dollars per week. The device (100) would then alert the customer (automatically or at the customer's request) when his or her purchases have exceeded these limits or when a purchase will place the purchase totals above these limits. This limit-setting could also be keyed to an extra or master password (biometric, textual, or otherwise) so that only certain individuals may override the limit notification. This may be beneficial if a device is distributed to children or in a business scenario for expense accounts.

As shown in FIG. 5, embodiments of the present invention may enable consumer financial reconciliation. Recorded device-based rating engine mobile transactions (singly or as a group) may be transferred automatically or at the customer's request into a consumer electronic register (e.g., personal finance software tools such as Quicken or Microsoft Money). Furthermore, the network provider may store the mobile commerce transactions and may add value and business opportunity by providing a reconciliation facility for such consumer programs as Quicken and Microsoft Money. This gives the network provider the capability to allow consumers to handle mobile commerce transactions in a similar manner as banking and credit card registers and reconciliation with these programs.

Referring to FIG. 4 again, the system may also facilitate customer control by allowing customers to implement financial classification and business expense management. The device-based rating engine (120) may allow users to identify and/or classify the types of mobile transactions that are occurring, and allow the user to upload selected transactions into financial management systems, such as a business expense management program. The system may present the user with a set of prompts at the time of purchase and may utilize the user's responses for identification and classification purposes.

The following descriptions provide an overview of the implementations of two embodiments of the present invention. First, as shown in FIG. 2, the PTD (100), which is enabled with a device-based rating engine (120), may passively participate in mobile commerce transactions. In this embodiment, the transaction may begin when the consumer (160) finishes shopping and selects a payment option to complete the purchase. The consumer (160) may be required to activate the PTD (100) by inputting the information necessary to unlock the security element. For example, the user may enter his or her secure PIN number or access code or may give a voice cue or biometric cue (i.e., placing his finger on the fingerprint sensor). The consumer (160) may then access the POS wallet (110) to select a payment method.

When the user (160) selects the payment method from the POS wallet (110), the PTD (100) may communicate with the point of sale device (POS) (150) at the store (300). The store (300) may be a physical store, a vending machine, an e-commerce web site, a virtual store, or any other type of place that sells goods or services. The PTD (100) may incorporate a communication technology, such as those provided by Bluetooth, IrDAFM (Infrared Data Association Financial Management), MeT (Mobile Electronic Transaction Forum), or any other wireless cable replacement technology. For instance, IrDA communication may be implemented as follows. The IrDA enabled device may use a polling scheme to collect responses from all devices in its line of sight within a certain range (other methods of detection may also be employed). This polling scheme may detect the store's POS (150) and the communication process may begin upon detection. In other embodiments, a Bluetooth enabled device may search for the merchant's POS using a Bluetooth Device Inquiry sequence and then request the Bluetooth Device Names of the discoverable devices. After obtaining these names, the PTD (100) may prompt the user (160) to ask which device to connect to and establish a link, channel, and connection to the selected device.

The PTD (100) may then send the payment method information from the POS wallet (110) to the POS (150) at the store. The POS (150) at the store may authorize the payment method. This authorization may entail communicating with a credit card authorization back-end system (400) and/or a bank authorization (140). After the authorization back-end system (400) approves the payment method, it may return a confirmation of authorization to the POS (150). The POS (150) may create an electronic receipt for the transaction. At this point, the POS (150) may send the electronic receipt to the POS wallet (110) installed on the PTD (100). The PTD may thus store an electronic receipt for each individual mobile commerce transaction.

The POS wallet (110) may pass the e-Receipt along to the device-based rating engine (120). The device-based rating engine (120) may review its price plan and stored value and then adjust the purchase price based on its vendor trusted partnerships and/or the consumer's past purchases. Therefore, if the network provider has a relationship with a particular vendor, for example, Starbucks, the device-based rating engine (120) may recognize when the consumer is participating in a transaction with Starbucks and automatically implement a pre-arranged e-Discount or present an e-Coupon.

The PTD (100) may further communicate with the network-provider's back-end system (200). Specifically, the device-based rating engine (120) may send the e-Receipt to the back-end operator (130), which allows the back-end system (200) to review the e-Receipt or review a set of the consumer's e-Receipts collectively. The network provider's back-end system (400) may then synchronize with the PTD (100). In particular, the operator's back-end (130) may send updates to the device-based rating engine (120).

Second, referring to FIG. 3, the enabled PTD (100), may actively participate in mobile commerce transactions. Again, the transaction may begin when the consumer (160) is selecting a payment option to complete a purchase. The consumer (160) may be required to first activate the PTD (100) by unlocking the security element as described above. The consumer (160) may query the device (100) to determine if there are any available coupons or discounts. The POS wallet (110) may consult the device-based rating engine (120), which may search for applicable discounts or coupons. The device-based rating engine (120) may consider its price plan, the network provider's relationship with the vendor, the customer's previous purchases, or any other relationship or historical factor to identify the available discounts or coupons.

The device-based rating engine (120) may generate the discounts or coupons or download the discounts and coupons from the network provider's back-end system (200). The device-based rating engine (120) may then return the available discounts and coupons to the POS wallet (110). The POS wallet (110) may display the discount information to the consumer (160), who may decide whether to accept any of the discount or coupon offerings. If there are no discounts or coupons available or if the customer (160) chooses to reject the offerings, then the transaction will proceed in a similar fashion as the passive participation embodiment (see FIG. 2).

If, however, the consumer (160) elects to accept a discount, the POS wallet (110) may send the discount information to the store's POS (150). The POS (150) may apply the discount and consequently, reduce the purchase price. The POS (150) may also display the discounted total to the consumer (160). Thus, the mobile commerce transaction may operate the same way as an in-store purchase where the customer hands a coupon to the store clerk. After the discount is applied, the system proceeds with the transaction processing.

The consumer (160) may access the POS wallet (110) and select a payment method. When the user (160) selects the payment method from the POS wallet (110), the PTD may (100) communicate with the point of sale device (POS) (150) at the store (300). The PTD (100) may then utilize the communication technology to send the payment method information from the POS wallet (110) to the POS (150) at the store.

The POS (150) at the store may authorize the payment method. This authorization may require communicating with a credit card authorization back-end system (400) and/or bank authorization (140). After the authorization back-end system (400) approves the payment method, it may send a notice of authorization to the POS (150). The POS (150) may also create an e-Receipt for the transaction. The POS (150) may send the e-Receipt to the POS wallet (110). The PTD (100) may store the e-Receipt for each consumer transaction.

The POS wallet (110) may transmit the e-Receipt to the device-based rating engine (120). The device-based rating engine (120) may consult its price plan and credits and then adjust the purchase price based on its vendor trusted partnerships and/or the consumer's past purchases. Therefore, if the network provider has a relationship with a particular vendor, then the device-based rating engine (120) may recognize when the consumer is participating in a transaction with the vendor and implement a pre-arranged e-Discount or present an e-Coupon.

The PTD (100) may then communicate with the network-provider's back-end system (200). Specifically, the device-based rating engine (120) may send each e-Receipt to the back-end operator (130), which allows the back-end system (200) to store e-Receipts for every mobile commerce transaction on the PTD (100), regardless of the vendor or payment method. The network provider's back-end system (200) may synchronize with the PTD (100) and forward updates to the device-based rating engine (120).

The PTD (100) may be configured to allow the consumer (160) to query the device and view the e-Receipts for prior transactions. Thus the systems and methods of the present invention may create value for consumers (160). Consumer value is created because the consumer (160) can query his or her PTD (100) to sort and view transaction, whether or not the transactions were made with the same vendor and/or payment method.

Embodiments of the present invention may provide a method of utilizing a PTD (100) to process consumer transactions. The PTD (100) may include a computerized engine, a point of sale wallet, which includes at least one transaction payment method, and a communications technology. The method may involve configuring the PTD (100) to communicate with a point of sale device and receive and store at least one electronic receipt for at least one mobile commerce transaction. The PTD (100) may then transmit each electronic receipt to a back-end processing system (200). The PTD (100) may selectively implement a discount associated with the mobile commerce transaction.

Embodiments may create value by allowing the network provider or other third party to facilitate a mobile commerce transaction through a wireless device. The method may include receiving a cross-product discount plan from at least one vendor and storing the discount plan in a database. The method may further include receiving a signal from a PTD regarding a mobile commerce transaction and comparing the vendor associated with the mobile commerce transaction against the discount plan. The network provider may then apply a discount to the mobile commerce transaction in real time or near real time based on the discount plan.

Similarly, the network provider may customize a mobile commerce transaction based on its partnership with a vendor. Embodiments of this method may include the steps of creating a joint marketing plan between the network provider and a vendor that incorporates a discount plan to be applied across all of a user's personal trusted devices and storing the discount plan in a database. The joint marketing plan may consist of any cooperative arrangement whereby the network provider and the vendor agree to market or promote their services and products. The network provider may then facilitate the mobile commerce transaction by receiving a signal from one of the user's personal trusted devices regarding a mobile commerce transaction, comparing the product associated with the mobile commerce transaction with the discount plan, and applying a cross-device discount to the mobile commerce transaction based on all of the mobile commerce transactions that have occurred on all of the user's personal trusted devices. The discount may be applied in real time or near real time.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A computerized system for processing consumer transactions comprising:
   (a) a personal trusted device comprising:
      (1) a computerized engine;
      (2) a point of sale wallet comprising at least one transaction payment method; and
      (3) a communications technology; and
   (b) a back-end processing system;
   wherein said computerized engine is configured to receive and store an electronic receipt for at least one mobile commerce transaction; said computerized engine transmits electronic receipts to said back-end processing system through said communications technology; and said computerized engine is programmed to selectively implement a cross-device discount associated with said mobile commerce transaction.

2. A system as claimed in claim 1, further comprising a point of sale device, wherein said computerized engine is configured to process said mobile commerce transaction by communicating with said point of sale device.

3. A system as claimed in claim 1, wherein said at least one transaction payment method is selected from a credit card, a debit card, a retailer loyalty card, a prepaid card, a carrier payment instrument, and combinations thereof.

4. A system as claimed in claim 1, wherein said discount comprises an electronic discount, an electronic coupon, or both.

5. A system as claimed in claim 1, wherein said discount is downloaded from said back-end processing system.

6. A system as claimed in claim 5, wherein said discount comprises a cross-product discount.

7. A system as claimed in claim 1, wherein said computerized engine is configured to selectively implement said discount based on a partnership.

8. A system as claimed in claim 7, wherein said partnership is between a network provider and at least one vendor.

9. A system as claimed in claim 1, wherein said computerized system is configured to apply said a cross-device discount on all of a user's personal trusted devices, all of a corporation's personal trusted devices, or all of a group of entities' personal trusted devices.

10. A system as claimed in claim 1, wherein said computerized engine is further configured to provide a user with a set of proactive information.

11. A system as claimed in claim 10, wherein said set of proactive information comprises current promotions, upcoming promotions, partnerships, and combinations thereof.

12. A system as claimed in claim 1, wherein said personal trusted device is further configured to display said electronic receipts.

13. A system as claimed in claim 12, wherein said computerized engine is further configured to sort said electronic receipts based on a set of user-defined factors.

14. A system as claimed in claim 13, wherein said set of user-defined factors is selected from date, time, dollar amount, payment method, discount, vendor, product type, or combinations thereof.

15. A computerized system for processing consumer transactions comprising:
 (a) a personal trusted device comprising:
  (1) a computerized engine; and
  (2) a point of sale wallet comprising at least one transaction payment method; and
 (b) a point of sale device;
 wherein said computerized engine is configured to: receive and store an electronic receipt for at least one mobile commerce transaction; provide a user with a set of proactive information; and
selectively implement a discount associated with said mobile commerce transaction based on a trusted partnership between two vendors.

16. A computer-readable medium encoded with computer executable instructions, for installation upon a personal trusted device comprising a computer memory, which configures said personal trusted device to:
 (a) communicate with a point of sale device;
 (b) receive and store an electronic receipt for at least one mobile commerce transaction;
 (c) transmit electronic receipts to a back-end processing system;
 (d) selectively implement a discount associated with said mobile commerce transaction; and
 (e) sort said electronic receipts based on a set of factors selected from date, time, dollar amount, payment method, discount, vendor, product type, or combinations thereof.

17. A method of utilizing a personal trusted device comprising a computerized engine, a point of sale wallet comprising at least one transaction payment method, and a communications technology to process consumer transactions, comprising the steps of:
 (a) configuring said personal trusted device to communicate with a point of sale device;
 (b) said personal trusted device receiving and storing at least one electronic receipt for at least one mobile commerce transaction;
 (c) said personal trusted device transmitting electronic receipts to a back-end processing system; and
 (d) said personal trusted device selectively implementing a cross-device discount associated with said mobile commerce transaction.

18. A method for facilitating a mobile commerce transaction through a wireless device comprising the steps of:
 (a) receiving a cross-product discount plan from at least one vendor;
 (b) storing said discount plan in a database;
 (c) receiving a signal from a computerized engine regarding a mobile commerce transaction;
 (d) comparing a vendor associated with said mobile commerce transaction with said discount plan; and
 (e) applying a discount to said mobile commerce transaction in real time or near real time based on said discount plan.

19. A method for facilitating a mobile commerce transaction through a wireless device comprising the steps of:
 (a) creating a joint marketing plan between a network provider and a vendor comprising a discount plan to be applied across all of a user's personal trusted devices;
 (b) storing said discount plan in a database;
 (c) receiving a signal from one of said user's personal trusted devices regarding a mobile commerce transaction;
 (d) comparing a product associated with said mobile commerce transaction with said discount plan;
 (e) applying a cross-device discount to said mobile commerce transaction based on all of the mobile commerce transactions that have occurred on all of said user's personal trusted devices in real time or near real time based on said discount plan.

* * * * *